(12) United States Patent
Lindoff et al.

(10) Patent No.: US 9,693,360 B2
(45) Date of Patent: Jun. 27, 2017

(54) METHODS, COMPUTER PROGRAMS, NETWORK NODE AND TRANSCEIVER DEVICE

(71) Applicant: Telefonaktiebolaget L M Ericsson (publ), Stockholm (SE)

(72) Inventors: Bengt Lindoff, Bjärred (SE); Ola Andersson, Svedala (SE); Bo Hagerman, Tyresö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 184 days.

(21) Appl. No.: 14/435,774

(22) PCT Filed: Mar. 25, 2015

(86) PCT No.: PCT/EP2015/056442
§ 371 (c)(1),
(2) Date: Apr. 15, 2015

(87) PCT Pub. No.: WO2016/150501
PCT Pub. Date: Sep. 29, 2016

(65) Prior Publication Data
US 2017/0048871 A1 Feb. 16, 2017

(51) Int. Cl.
*H04L 12/50* (2006.01)
*H04W 72/08* (2009.01)
(Continued)

(52) U.S. Cl.
CPC .......... *H04W 72/082* (2013.01); *H04L 1/00* (2013.01); *H04L 5/0032* (2013.01);
(Continued)

(58) Field of Classification Search
CPC .................................................. H04W 72/082
(Continued)

(56) References Cited

U.S. PATENT DOCUMENTS 5,345,598 A 9/1994 Dent
6,438,356 B1 8/2002 Lilja et al.
(Continued)

FOREIGN PATENT DOCUMENTS

CN 103858355 A 6/2014
GB 2508383 A 6/2014

*Primary Examiner* — Dang Ton
(74) *Attorney, Agent, or Firm* — Coats & Bennett, PLLC

(57) ABSTRACT

A method of a network node of a radio access network is provided for detecting interference caused by intermodulation on a receive frequency of the network node. The method comprises determining at least one frequency of a signal which potentially gives rise to an intermodulation product on the receive frequency. The method comprises transmitting a request to a transceiver device, wherein the request includes information about the determined at least one frequency and an instruction to monitor that at least one frequency. The method comprises estimating interference level at the receive frequency at one or more time instants. The method comprises receiving a measurement report from the transceiver device, wherein the measurement report includes information about signal levels on the at least one frequency at one or more time instants. The method comprises determining whether the signal on the at least one frequency is probable to cause intermodulation interference on the receive frequency based on the estimated interference level at the receive frequency and the measurement report. Corresponding method of a transceiver device, a network node and computer programs for implementing the methods are also disclosed.

29 Claims, 8 Drawing Sheets

(51) Int. Cl.
   *H04W 24/10* (2009.01)
   *H04L 1/00* (2006.01)
   *H04L 5/00* (2006.01)
   H04B 1/10 (2006.01)
   H04B 1/525 (2015.01)
   H04W 88/10 (2009.01)

(52) U.S. Cl.
   CPC ............ *H04W 24/10* (2013.01); *H04B 1/109* (2013.01); *H04B 1/1027* (2013.01); *H04B 1/525* (2013.01); *H04W 88/10* (2013.01)

(58) Field of Classification Search
   USPC ........................................................ 370/339
   See application file for complete search history.

(56) References Cited

U.S. PATENT DOCUMENTS

| | | | |
|---|---|---|---|
| 6,868,277 B1 * | 3/2005 | Cerwall | H04W 72/085 370/329 |
| 8,401,507 B2 | 3/2013 | Hillery et al. | |
| 8,837,401 B2 | 9/2014 | Immonen et al. | |
| 9,025,478 B2 | 5/2015 | Jung et al. | |
| 2005/0063487 A1 | 3/2005 | Sayegh | |
| 2009/0318087 A1 | 12/2009 | Mattila et al. | |
| 2012/0236736 A1 | 9/2012 | Frank et al. | |
| 2013/0194938 A1 | 8/2013 | Immonen et al. | |
| 2013/0194984 A1 | 8/2013 | Cheng et al. | |
| 2013/0322395 A1 | 12/2013 | Kazmi et al. | |
| 2015/0036514 A1 | 2/2015 | Zhu et al. | |
| 2016/0156422 A1 | 6/2016 | Lindoff et al. | |
| 2016/0301436 A1 | 10/2016 | Zou et al. | |
| 2016/0322995 A1 | 11/2016 | Bevan et al. | |
| 2016/0374096 A1 | 12/2016 | Lindoff et al. | |

* cited by examiner

METHODS, COMPUTER PROGRAMS, NETWORK NODE AND TRANSCEIVER DEVICE

TECHNICAL FIELD

The present invention generally relates to methods for a network node and for a transceiver device, respectively, a network node and a transceiver device, and computer programs for implementing the methods. In particular, the present invention relates to detecting interference caused by intermodulation.

BACKGROUND

In wireless communication systems, interference by radio frequency (RF) transmitters for RF communication systems may become an issue.

The purpose of a transmitter in a digital wireless communication system is to convert a digital low-frequency baseband signal into an RF signal while preserving the modulation, and thereby the baseband information. In a full duplex system, a radio receives and transmits information simultaneously, which may be performed according to frequency duplex division (FDD), i.e. the radio transmits on one frequency and receives on another frequency. This means that, despite the fact that receive (RX) and transmit (TX) signals are spaced in frequency by a duplex distance, distortion products caused by nonlinearities in the transmitter may fall into the receive band and raise the over-all receiver noise figure, and cause non-compliance with a transmit spectrum mask. In order to reduce this effect, external cavity filters may be used in radio base stations (RBS) to filter out unwanted components outside wanted transmission bands. However, intermodulation products caused by multiple transmitted signals, e.g. own TX signal in combination with an interferer signal, may also position unwanted tones in the receive band and thus degrade the receiver signal-to-noise-ratio (SNR). These unwanted tones are not possible to filter out by frequency filtering and they are thus to be handled by the receiver.

In a multi operator FDD RBS site solution, each operator uses a unique paired spectrum and the spectrum parts thus become separated in frequency so as not to interfere with each other's operations. There is no joint scheduling required among the operators, meaning that simultaneous transmissions may occur. However, due to non-linear effects caused by for instance excitation of ferromagnetic materials or other physical properties, e.g. metal oxidation, mechanical disruptions, etc., passive intermodulation (PIM) products may be reflected back to or within the RBS site and fall into one of the operator's receive bands and cause desensitization. As a result, the created passive inter-modulation, PIM, products caused by the multi operator transmissions may result in lowered received uplink SNR for some scenarios. The problem may also arise in the case when the same operator uses two different carrier frequencies, e.g. operating in carrier aggregation setup, in any direction. The problem may also affect or be affected by frequencies used for time division duplex (TDD) upon such relations between frequencies.

A normal operation to handle such problems would be to send a service technician to the RBS site to try to find the cause and replace or mend the causing element. However, such an operation may take a while, and there may be a not fully functioning RBS for a longer or shorter time.

In the case when two FDD downlink bands are separated by the same frequency distance as the duplex distance for one of the FDD receiver frequencies, third order PIM products may become collocated within a receive band without the possibility to be suppressed by filtering as discussed above. As a result, the noise level of the affected receiver will increase and lower the received SNR in the uplink.

An example is illustrated in FIG. 1 where two transmitted signals 100, 102, for example 3GPP frequency band 29 and band 17, from the same RBS give rise to a PIM product 104, in this case due third order intermodulation, i.e. at 2·f1-f2, where f1 is the frequency of transmission in B17 and f2 is the transmission frequency in band 29, falling into the receive band 106 of band 17. As a result, in the band 17 the receiver will lower its sensitivity and face reduced coverage. Continuing this example with reference to FIG. 2, a base station 200 is operating a cell 202. The lowered sensitivity will decrease the possible coverage of the cell to a limited coverage 204. This could potentially lead to dropped connections or limited application coverage as illustrated by UE A 206 in FIG. 2, while for UEs closer to the network node 200, e.g. UE B 208, the communication may still work. This may lead to the operator missing traffic (to be billed) and/or less satisfaction by subscribers.

This may become more and more of a problem the more bands that are available, since with more bands there will be larger risks for co-sited RBSs for different operators, which may create PIM affecting any of the operators' receive bands. For the sake of brevity and easier understanding, the issue has been demonstrated above where intermodulation is caused by two frequencies, but similar effects may arise from further used frequencies, and used frequencies intermodulating with intermodulation products, and so on. That is, the more frequencies used at a network node site, the more likely is it that an intermodulation product affects a receive band.

It is therefore a desire to detect such situations.

SUMMARY

The invention is based on the understanding that the above situation may or may not occur depending on situations that are hard to predict, e.g. the case of intermodulation caused by occurred metal oxidation. To determine whether the situation has occurred, the inventors suggest an approach including distributed collection of information for the determination.

According to a first aspect, there is provided a method of a network node of a radio access network for determining whether a signal on a receive frequency of the network node comprises intermodulation. The method comprises determining at least one frequency of a signal which potentially gives rise to an intermodulation product on the receive frequency. The method comprises transmitting a request to a transceiver device, wherein the request includes information about the determined at least one frequency and an instruction to monitor that at least one frequency. The method comprises estimating interference level at the receive frequency at one or more time instants. The method comprises receiving a measurement report from the transceiver device, wherein the measurement report includes information about signal levels on the at least one frequency at one or more time instants. The method comprises determining whether the signal on the receive frequency of the network node comprises interference caused by intermodulation based on the estimated interference level at the receive frequency and the measurement report.

The determining of the at least one frequency may comprise accessing a look-up table based on the receive frequency, or alternatively may comprise calculating the at least one frequency based on the receive frequency and knowledge about used frequency scheme.

The transmitting of the request may comprise transmitting a measurement report request according to a radio resource management, RRM, procedure.

The information about the signal levels of the signal on the at least one frequency may comprise any of an indication on received signal strength on the at least one frequency, a metric for received power for a reference signal on the at least one frequency, a metric for received quality for the reference signal on the at least one frequency, an aggregate metric formed from the metric for received power and the metric for received quality for the reference signal on the at least one frequency, or any combination thereof.

The determining whether the signal on the receive frequency of the network node comprises interference caused by intermodulation may include correlating the estimated interference level at the receive frequency and the information about signal levels of the signal on the at least one frequency for corresponding time instants.

The estimate of interference level at the receive frequency and the information about signal levels of the signal on the at least one frequency may be accompanied with an indication of the respective one or more time instants.

The request may be accompanied with an indication of the one or more time instants.

The method may comprise transmitting a request to a second transceiver device, wherein the request includes information about the determined at least one frequency and an instruction to monitor that signal on the at least one frequency, and receiving a second measurement report from the second transceiver device, wherein the second measurement report includes information about signal levels of a signal on the at least one frequency at one or more time instants, and wherein the determining of whether the signal on the receive frequency of the network node comprises interference caused by intermodulation may also be based on the second measurement report.

According to a second aspect, there is provided a computer program comprising instructions which, when executed on a processor of a network node, causes the network node to perform the method according to the first aspect.

According to a third aspect, there is provided a network node of a radio access network. The network node comprises a transmitter, a receiver, and a controller. The controller is arranged to determine at least one frequency of a signal which potentially gives rise to an intermodulation product on a receive frequency of the network node. The controller is also arranged to cause the transmitter to transmit a request to a transceiver device, wherein the request includes information about the determined at least one frequency and an instruction to monitor that signal on the at least one frequency. The controller is further arranged to estimate an interference level of a signal received by the receiver at the receive frequency at one or more time instants. The receiver is arranged to receive a measurement report from the transceiver device, wherein the measurement report includes information about signal levels of the signal on the at least one frequency at the one or more time instants. The controller is arranged to determine whether the signal on the receive frequency of the network node comprises interference caused by intermodulation based on the estimated interference level at the receive frequency and the measurement report.

The controller may be arranged to access a look-up table based on the receive frequency to determine the at least one frequency or alternatively to calculate the at least one frequency based on the receive frequency and knowledge about used frequency scheme.

The request may comprise a measurement report request according to a radio resource management, RRM, procedure.

The information about signal levels of the signal on the at least one frequency may comprise any of an indication on received signal strength on the at least one frequency, a metric for received power for a reference signal on the at least one frequency, a metric for received quality for the reference signal on the at least one frequency, an aggregate metric formed from the metric for received power and the metric for received quality for the reference signal on the at least one frequency, or any combination thereof.

The controller may be arranged to correlate the estimated interference level at the receive frequency and the information about signal levels of the signal on the at least one frequency for corresponding time instants to determine whether the signal on the at least one frequency is probable to cause intermodulation interference.

The controller may be arranged to cause a remote element to correlate the estimated interference level at the receive frequency and the information about signal levels of the signal on the at least one frequency for corresponding time instants to determine whether the signal on the receive frequency of the network node comprises interference caused by intermodulation.

The estimate of interference level at the receive frequency and the information about signal levels of the signal on the at least one frequency may be accompanied with an indication on respective time instants.

The request may be accompanied with an indication on the one or more time instants.

The controller may be arranged to cause the transmitter to transmit a request to a second transceiver device, wherein the request includes information about the determined at least one frequency and an instruction to monitor that at least one frequency, and the receiver may be arranged to receive a second measurement report from the second transceiver device, wherein the second measurement report includes information about signal levels of a signal on the at least one frequency at one or more time instants, and wherein the controller may be arranged to determine whether the signal on the receive frequency of the network node comprises interference caused by intermodulation also based on the second measurement report.

According to a fourth aspect, there is provided a method of a transceiver device, arranged to operate in a radio access network, for collecting data for determination whether a signal on a receive frequency of a network node comprises interference caused by intermodulation. The method comprises receiving a request from the network node wherein the request includes information about at least one frequency of a signal which potentially gives rise to an intermodulation product on the receive frequency of the network node and an instruction to monitor that at least one frequency. The method comprises monitoring signal levels of the signal on the at least one frequency at one or more time instants. The method comprises transmitting a measurement report to the network node, wherein the measurement report includes information about the signal levels at the one or more time instants of the signal on the at least one frequency.

The request may comprise a measurement report request according to a radio resource management, RRM, procedure.

The information about signal levels of the signal on the at least one frequency may comprise any of an indication on received signal strength on the at least one frequency, a metric for received power for a reference signal on the at least one frequency, a metric for received quality for the reference signal on the at least one frequency, an aggregate metric formed from the metric for received power and the metric for received quality for the reference signal on the at least one frequency, or any combination thereof.

The information about signal levels of the signal on the at least one frequency may be accompanied with an indication of the respective time instants.

The request may be accompanied with an indication of the one or more time instants.

The method may comprise receiving a request from a second network node, wherein the request includes information about at least one frequency of a signal which potentially gives rise to an intermodulation product on a receive frequency of the second network node and an instruction to monitor that at least one frequency. The method may comprise monitoring signal levels of the signal on the at least one frequency which potentially gives rise to an intermodulation product on the receive frequency of the second network node at one or more time instants. The method may comprise transmitting a second measurement report to the second network node, wherein the second measurement report includes information about signal levels at the one or more time instants of the signal on the at least one frequency which potentially gives rise to an intermodulation product on the receive frequency of the second network node.

According to a fifth aspect, there is provided a computer program comprising instructions which, when executed on a processor of a transceiver device, causes the transceiver device to perform the method according to the fourth aspect.

According to a sixth aspect, there is provided a transceiver device arranged to work in a radio access network. The transceiver device comprises a transmitter, a receiver, and a controller. The receiver is arranged to receive a request from a network node of the radio access network, wherein the request includes information about at least one frequency of a signal which potentially gives rise to an intermodulation product on a receive frequency of the network node and an instruction to monitor that at least one frequency. The controller is arranged to control monitoring of signal levels of a signal received by the receiver on the at least one frequency at one or more time instants and to form a measurement report, wherein the measurement report includes information about the signal levels of the signal on the at least one frequency at the one or more time instants. The transmitter is arranged to transmit the measurement report to the network node.

The request may comprise a measurement report request according to a radio resource management, RRM, procedure.

The information about signal levels of the signal on the at least one frequency may comprise any of an indication on received signal strength on the at least one frequency, a metric for received power for a reference signal on the at least one frequency, a metric for received quality for the reference signal on the at least one frequency, an aggregate metric formed from the metric for received power and the metric for received quality for the reference signal on the at least one frequency, or any combination thereof.

The information about signal levels of the signal on the at least one frequency may be accompanied with an indication on the respective one or more time instants.

The request may be accompanied with an indication on the one or more time instants.

The receiver may be arranged to receive a request from a second network node, wherein the request includes information about at least one frequency of a signal which potentially gives rise to an intermodulation product on a receive frequency of the second network node and an instruction to monitor that signal on the at least one frequency. The controller may be arranged to control monitoring of signal levels, by the receiver, of the signal on the at least one frequency that potentially gives rise to the intermodulation product on the receive frequency of the second network node at one or more time instants and to form a second measurement report. The second measurement report may include information about signal levels of the signal on the at least one frequency that potentially gives rise to the intermodulation product on the receive frequency of the second network node at the one or more time instants. The transmitter may be arranged to transmit the second measurement report to the second network node.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

DETAILED DESCRIPTION

Methods of detecting interference, a network, NW, node, a transceiver device, and computer programs for the same are disclosed below. The interference is caused by intermodulation in a NW node, or NW node site comprising a plurality of co-located NW nodes, for wireless communication with a set of transceiver devices for wireless communication. The term "co-located" should in this context include the network nodes being located in the same spot or housing, as well at being in close proximity such that signals from the network nodes may cause intermodulation products as discussed above. A transceiver device in this context may for example be a user equipment, UE, a modem, a cell phone, smartphone, sensor, a computer or, any electric or electronic device capable of wireless communication with a NW node. In some embodiments the transceiver device may also be another NW node. More and more items known as rather simple objects are now capable of wireless communication, which provides for some of the improvements in many fields, even outside the conventional telecommunication industry. Examples are sensors, machines, medical equipment, monitoring devices, etc. that have been enhanced by being able to wirelessly communicate with wireless nodes of different wireless communication systems.

In this disclosure below, embodiments are exemplified within a 3GPP LTE context for the sake of easier understanding, but the invention is not limited to that Radio Access Technology (RAT). Other RATs, such as any of the commonly used technologies for public land mobile networks, may benefit from the invention in a similar way.

Figure 3:
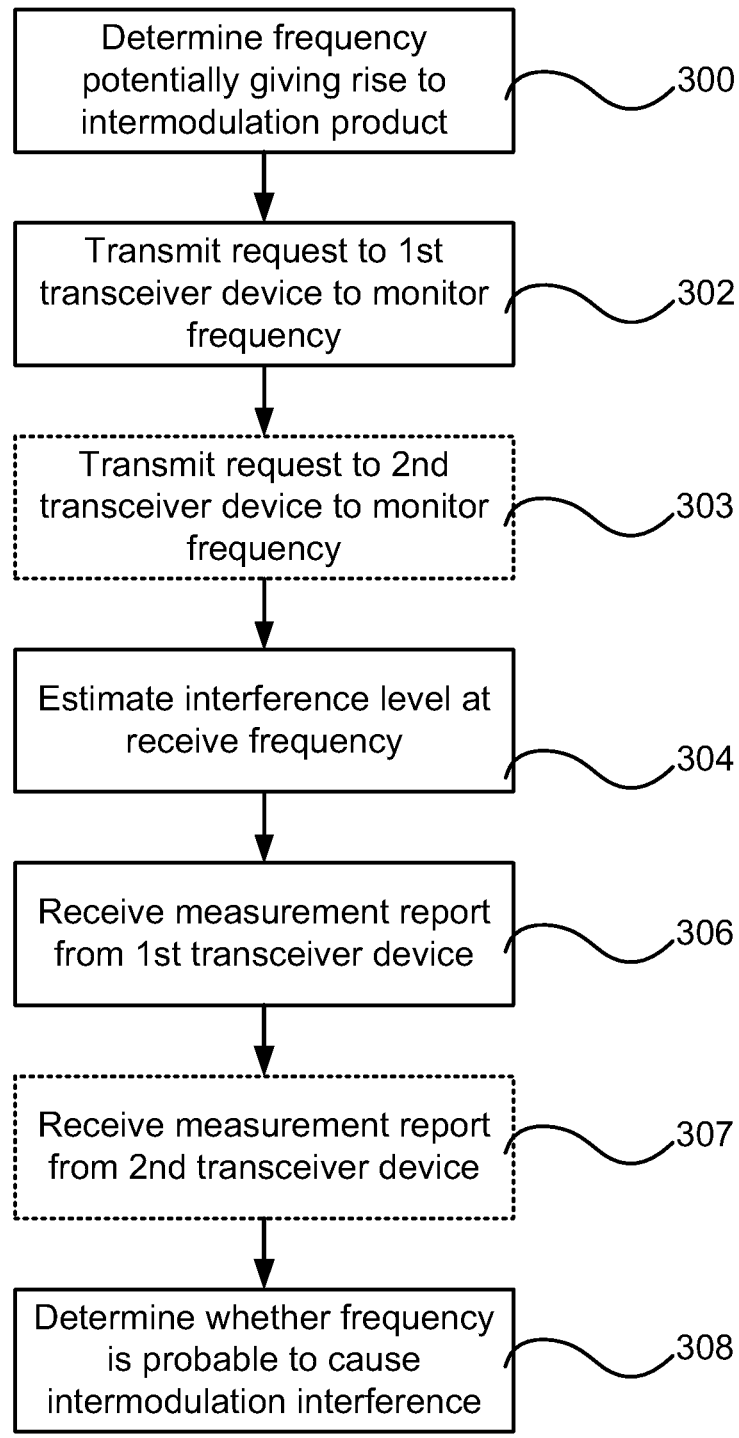
FIG. 3 is a flow chart illustrating a method of a network node for detecting interference caused by intermodulation according to an embodiment.

FIG. 3 is a flow chart illustrating a method of a NW node for detecting interference caused by intermodulation according to an embodiment. The NW node determines 300 one or more frequencies that may give rise to an intermodulation product at a receive frequency used by the NW node. Since the NW node inherently knows the receive frequency and the frequency schedule for the band in which the radio network is allowed to operate is presumed to be known, the NW node may calculate which frequency or frequencies that may give rise to the possible intermodulation product at the receive frequency. Alternatively, the calculations are made in advance and stored in a look-up table, wherein the NW node accesses the look-up table based on the receive frequency and gets the frequency or frequencies that may give rise to the possible intermodulation product at the receive frequency.

In the following description, for the sake of easier understanding, it is assumed that only one frequency is determined 300 as demonstrated above. However, for a case where more than one frequency is determined 300, a similar process is applied but repeated for the determined frequencies.

The NW node transmits 302 a request to a first transceiver device to monitor the determined frequency. Optionally, the NW node may transmit 303 the request also to other transceiver devices to enable gathering of more data about signals on the determined frequency. The request may be open in sense of timing, i.e. the transceiver device will monitor the frequency whenever possible, or the monitoring time instants are pre-programmed in the transceiver device. Alternatively the request is accompanied with an indication on one or more time instants on which the transceiver device is to monitor signals on the frequency. The request may use structures provided by the radio access network, e.g. the request may comprise a measurement report request according to a radio resource management, RRM, procedure for which signalling etc. may already be established.

Interference level at the receive frequency is estimated 304 at one or more time instants. Also here, the time instants may be open in sense of timing, i.e. a receiver of the NW node will monitor the receive frequency whenever possible. Alternatively, the monitoring time instants are pre-programmed in the NW node, preferably corresponding to possible pre-programming of the transceiver device, or the time instants are synchronised with the one or more time instants of possible indications accompanied with the request to the transceiver device. The estimation 304 of interference level in other senses may be performed in a traditional way.

The NW node receives 306 one or more measurement reports from the first transceiver device. Optionally, the NW node may also receive 307 one or more measurement reports from other transceiver devices for the enabling of gathering of more data about signals on the determined frequency. A measurement report comprises information about signal levels on the frequency. The information about signal levels may comprise any of an indication on received signal strength on the frequency, a metric for received power for a reference signal on the frequency, a metric for received quality for the reference signal on the frequency, an aggregate metric formed from the metric for received power and the metric for received quality for the reference signal on the frequency, or any combination thereof. The measurement report may also comprise an indicator on the time instants for respective signal level information piece. Alternatively, the timing for the respective signal level information pieces may be inherent in any of the structures for timing of the time instants discussed above.

Now, the NW node has knowledge about interference level at the receive frequency at one or more known time instants, and knowledge about signal levels of the frequency that possibly may cause intermodulation products on the receive frequency and again at the one or more known time instants. Here, the time instants for the gathered information about signal levels on the determined frequency and the time instants for the estimated interference level at the receive frequency, respectively, should overlap, i.e. be corresponding, such that analysis on whether the signal on the determined frequency has an impact on the interference level at the receive frequency is enabled. From this information, the NW node determines 308 whether the determined frequency is probable to cause intermodulation frequency on the receive frequency. The determination 308 may include correlating the estimated interference level at the receive frequency and the information about signal levels on the frequency for corresponding time instants. The determination 308 may include comparing a correlation or other metric derived from the collected information with a threshold for deciding whether the determined frequency substantially affects the receive frequency with intermodulation products. It is to be noted that the timing information may not be completely aligned, and the determination 308 may include time adjustments between data on the estimated interference level at the receive frequency and data on the information about signal levels on the frequency. This time adjustment may also be made prior the determination 308, e.g. at reporting, at receiving and processing of measurement reports, etc.

For example, if it is decided that the determined frequency substantially affects the receive frequency with intermodulation products, actions may be taken to alleviate the issue, e.g. as described in International Patent Application No. PCT/EP2014/076001. Alternatively, the correlation or the other metric may be used directly, as e.g. a soft value, for controlling actions to alleviate the issue.

The determination 308 may also be based on several measurement reports. Statistics based on the receive signal interference levels and information, provided by one or more remote transceiver devices, about signal levels may be collected over time to provide sufficient statistics to correlate the receive signal interference levels with signal levels reported from the one or more transceiver devices at corresponding time instants. Some input for the statistics is collected by the NW node by aid of remote element(s), i.e. the transceiver device(s), and some input for the statistics is collected by the NW node itself, i.e. by interference level estimation. A statistics mechanism, which may comprise database and processing means, may form the statistics on which the determination 308 is made. Thus, the determination 308 of the method demonstrated above may be performed by the statistics mechanism, which may be a part of the NW node, e.g. the eNodeB. Alternatively, also the determination 308 may be a distributed task. For example, the NW node may comprise an interface arranged to provide the collected information to a statistics mechanism of another remote element, e.g. a node in the core network or a remotely arranged server. The distribution of the task may also include to transmit the estimated interference level from the NW node to a transceiver device which then performs both the monitoring and the determination. In such a case, the transmission of the measurement report from the transceiver device is substituted by transmission of a determination report from the transceiver device.

For making the correlation, the statistics to be correlated may be received from the statistics mechanism and the correlations or the like are done thereon. Alternatively, the correlations or the like are also done remotely, and the interface of the NW node only receives the correlation or the other metric which then may be used for decisions and/or controlling actions to alleviate the issue with intermodulation products at the receive frequency.

The correlation operation may include more or less sophisticated algorithms. An option is to estimate correlation as covariance as $$\text{Mean}(X \cdot Y) - \text{Mean}(X) \cdot \text{Mean}(Y),$$

where $X(t)$ is estimated interference at receive frequency at time t, $Y(t)$ is reported signal level of the signal on the determined frequency at time t, and Mean( ) indicates an averaging to estimate an expected value of respective parameter. For example, when the covariance is normalized, a correlation coefficient is obtained. From this a linear function describing the relation between the variables may be obtained. In this sense covariance may be used as a linear gauge of dependence, on which the probability of whether the determined frequency causes an intermodulation signal on the receive frequency may be based. It is to be noted that other approaches, which are known within the field of statistical analysis, for showing dependence (or independence) between estimated interference at receive frequency and reported signal level of the signal on the determined frequency may be applied as well for determining whether the determined frequency causes an intermodulation signal on the receive frequency.

One approach for limiting computational efforts may include to, for each time instant where both a value for estimated interference at receive frequency and reported signal level of the signal on the determined frequency are present, set a first logic signal when the estimated interference at receive frequency is above a first threshold and set a second logic signal when reported signal level of the signal on the determined frequency is above a second threshold, perform an exclusive-OR operation on the first and second logic signals and provide the result of the exclusive-OR operation to a shift register. As values are provided from estimation and reporting, the shift register, which has finite length, will hold an indication which may be summed and when the sum is below a third threshold, intermodulation interference on the receive signal caused by the signal of the determined frequency is considered present.

The monitoring and building of statistics may for example be an ongoing process as transmissions and receptions are performed at the NW node while the determining 308, e.g. correlating and/or forming other metrics, may be performed periodically. However, the monitoring and building of statistics may also be made periodically, wherein the period for monitoring may be equal or shorter than the period for the determining 308 whether the determined frequency is probable to cause the intermodulation interference.

A NW node in this context may operate on one or more frequency bands, e.g. one frequency band both for receiving and transmitting, one frequency band for transmitting and another frequency band for receiving, or one or more frequency bands for respective transmitting and receiving. Thus, the NW node(s) may operate in time division duplex, TDD, frequency division duplex, FDD, and/or with carrier aggregation, wherein different frequency relationships may occur where a received channel may be interfered by intermodulation from a transmitted channel in a NW node site comprising a set of network nodes, i.e. one or more, capable of wireless communication with a set of devices for wireless communication.

Not only the absolute value of the interference may be monitored; the determination may as well be made based on variations in the interference level, i.e. an increase in interference level in view of signal levels of a determined frequency may be a sign of occurring intermodulation. Thus, for the discussion above where the term "interference level" is mentioned, the same applies when substituting it with "increase of interference level". Particularly in this case, a decided action based on the determining 308 may be an alarm function in the radio access network, e.g. for directing a proper manual operation, i.e. send "a man in a van" to mend it.

Figure 1:
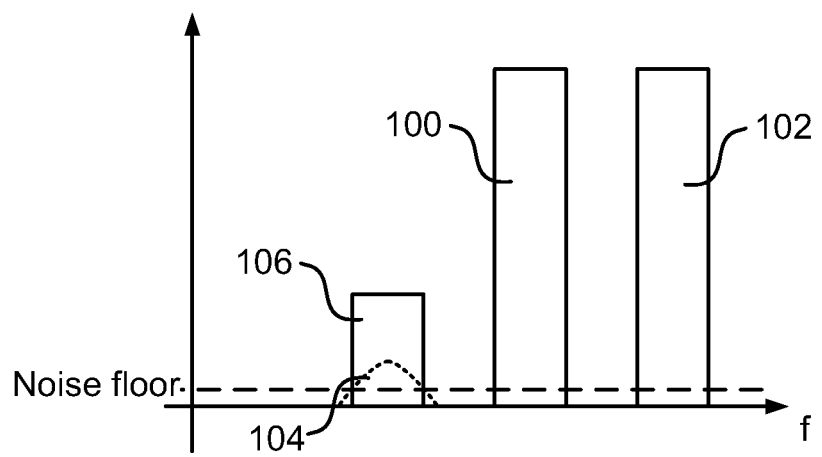
FIG. 1 schematically illustrates how intermodulation issues may degrade a signal.
Figure 2:
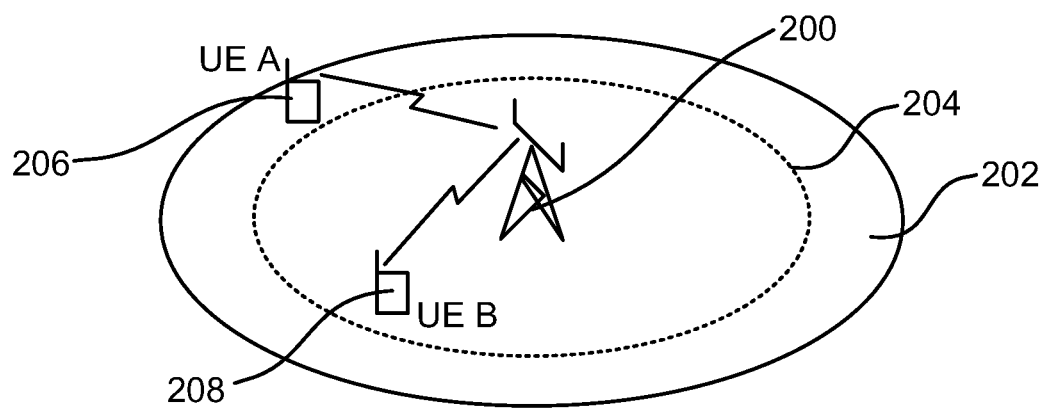
FIG. 2 schematically illustrates a base station operating a cell and how intermodulation degradation may limit the range of the base station.
Figure 4:
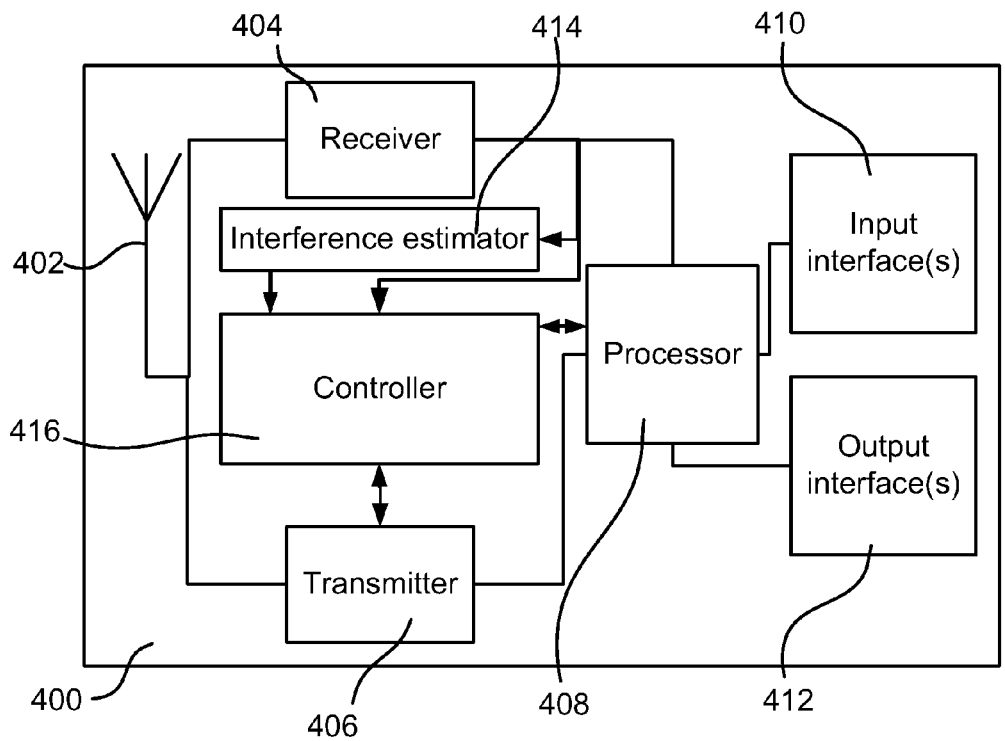
FIG. 4 is a block diagram schematically illustrating a network node according to an embodiment.

FIG. 4 is a block diagram schematically illustrating a NW node 400 according to an embodiment. The NW node 400 comprises an antenna arrangement 402, a receiver 404 connected to the antenna arrangement 402, a transmitter 406 connected to the antenna arrangement 402, a processing element 408 which may comprise one or more circuits, one or more input interfaces 410 and one or more output interfaces 412. The interfaces 410, 412 can be user interfaces and/or signal interfaces, e.g. electrical or optical. The NW node 400 is arranged to operate in a cellular communication network, e.g. as a base station operating a cell. In particular, by the processing element 408 being arranged to perform the embodiments demonstrated with reference to FIGS. 2 and 3, the NW node 400 is capable of determining intermodulation interference issues. The processing element 408 can also fulfil a multitude of tasks, e.g. signal processing to enable reception and transmission since it is connected to the receiver 404 and transmitter 406, executing applications, controlling the interfaces 410, 412, etc.

The receiver 404 is here demonstrated as a single element, but may be construed as one or more receiver circuits receiving at one or more frequencies. The same applies for the transmitter 406.

The NW node 400 may comprise an interference level estimator 414 arranged to estimate an interference level on the uplink carrier frequency band, i.e. on the receive frequency of the NW node 400. The interference level estimator 414 is thus connected to an output of the receiver 404 to be able to gain signal levels and information for performing its task. The NW node 400 may further comprise a controller 416 arranged to receive an output from the interference level estimator 414 and received measurement reports from the receiver 404 to be able to determine whether the interference level indicates probable intermodulation interference. The controller 416 may also be arranged to interact with the processing element 408 of the NW node 400, and/or with the interfaces 410, 412 for communication with remote elements, e.g. for external statistics mechanism, external correlator, etc. The interference level estimator 414 and the controller 416 may thus determine if intermodulation issues exist, which may be performed according to any of the examples given above.

The controller 416 is further arranged to form a request to one or more transceiver devices to monitor a determined frequency. Thus, the controller 416 is arranged to determine the frequency (or frequencies) to be monitored, as demonstrated above, e.g. by calculating or accessing a look-up table. The controller 416 is also arranged to determine the one or more transceiver devices that will be used for collecting information about signal levels on the frequency. Information about suitable transceiver devices may be gained from the processing element 408 which can have knowledge of transceiver devices connected to or camping on the cell operated by the NW node 400, and possibly their capabilities for performing such monitoring. The request is provided to the transmitter 406 for providing it to the one or more transceiver devices.

The interference level estimator 414 is illustrated as a separate functional element, but may be implemented within the controller 416 in some embodiments. The controller 416 is illustrated as a separate functional element, but may be implemented within the processing element 408 in some embodiments. For example, the interference estimator 414 and the controller 416 may be implemented as software objects handled by the processing element 408.

Figure 5:
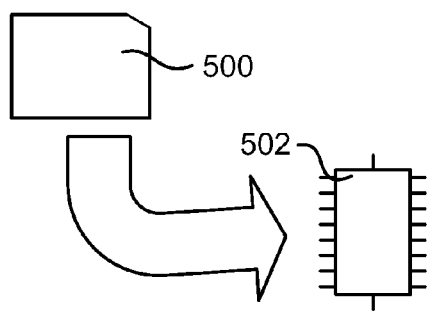
FIG. 5 schematically illustrates a computer-readable medium and a processing device of a network node according to an embodiment.

The methods according to the present invention is suitable for implementation with aid of processing means, such as computers and/or processors, especially for the case where the processing element 408 and/or controller 416 demonstrated above comprises a processor determining interference caused by intermodulation in a network node for wireless communication capable of communication with a set of transceiver devices for wireless communication, as demonstrated above. Therefore, there are provided computer programs, comprising instructions arranged to cause the processing means, processor, or computer to perform the steps of any of the methods according to any of the embodiments described with reference to FIG. 3. The computer programs preferably comprises program code which is stored on a computer readable medium 500, as illustrated in FIG. 5, which can be loaded and executed by a processing means, processor, or computer 502 to cause it to perform the methods, respectively, according to embodiments of the present invention, preferably as any of the embodiments described with reference to FIG. 3. The computer 502 and computer program product 500 can be arranged to execute the program code sequentially where actions of the any of the methods are performed stepwise. The processing means, processor, or computer 502 may be an embedded system. Thus, the depicted computer readable medium 500 and computer 502 in FIG. 5 should be construed to be for illustrative purposes only to provide understanding of the principle, and not to be construed as any direct illustration of the elements.

Figure 6:
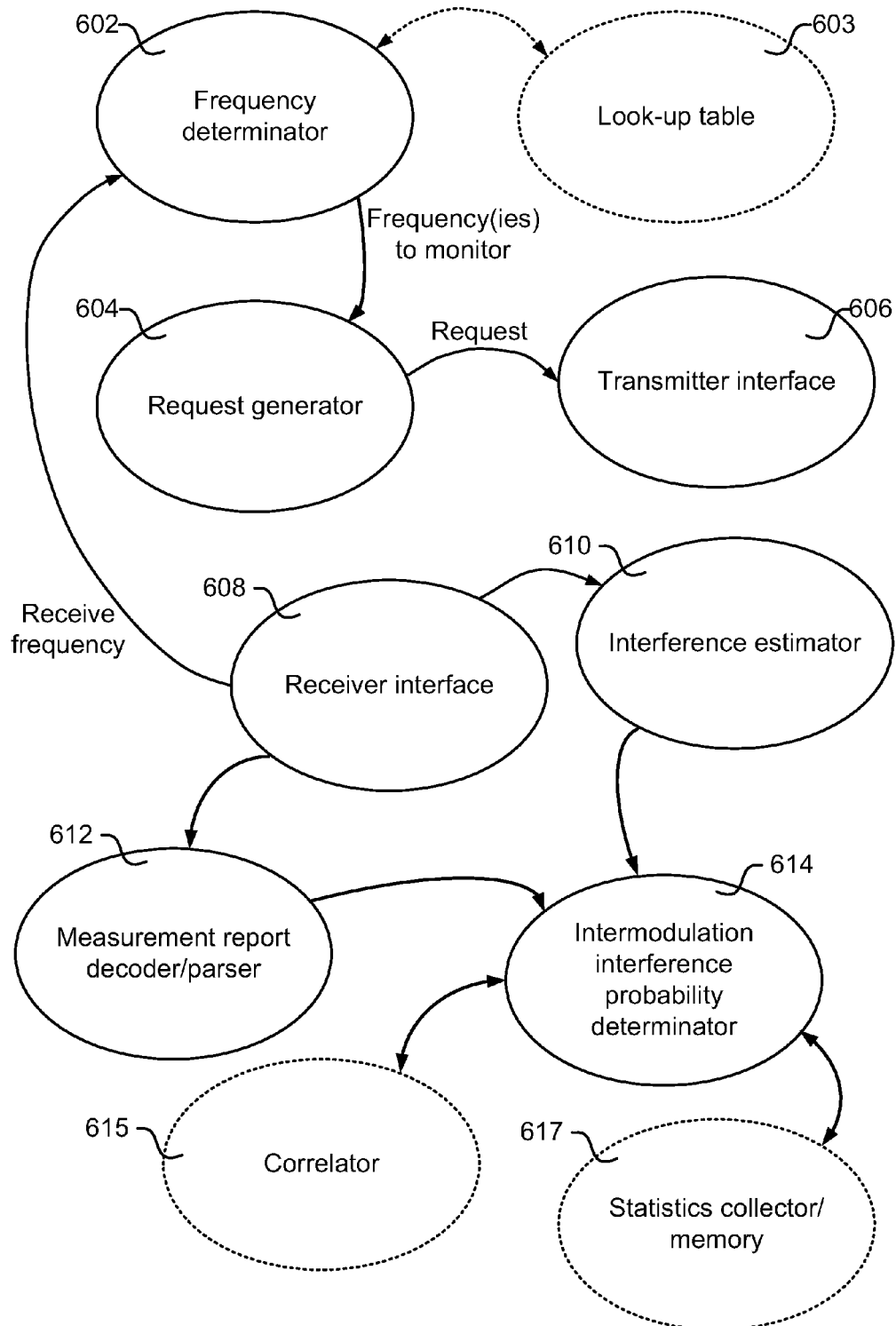
FIG. 6 schematically illustrates functional elements for detecting interference caused by intermodulation in a network node for wireless communication according to an embodiment.

The implementation of the above demonstrated approach for determining possible intermodulation interference at a receive frequency of a NW node may comprise software and hardware elements. FIG. 6 is a schematic representation of such elements and their interactions according to an embodiment. A frequency determinator element 602 is arranged to determine what frequency or frequencies that may cause intermodulation products at the receive frequency. The receive frequency is maybe gained from a receiver interface 608, e.g. present at a processing element controlling the receiver of the NW node. Here, more than one receive frequency may be present, e.g. during carrier aggregation operation in an uplink, wherein the herein demonstrated operations are repeated for each of the receive frequencies. For the sake of easier understanding, the disclosure below is made for a scenario that one receive frequency is used, and one frequency that may cause intermodulation products is determined, but as is evident from this disclosure, the same principles apply for multiple receive frequencies and for multiple frequencies for each receive frequency that may cause intermodulation products by multiplication of the actions. The frequency determinator element 602 may calculate the frequency that may cause the intermodulation products in the receive frequency. Alternatively, the frequency determinator element may access a look-up table element 603 which based on information about the receive frequency returns information about the possible frequency to the frequency determinator element 602.

Once the frequency determinator element 602 has determined the frequency to be monitored, it provides it to a request generator element 604. The request generator element 604 also determines one or more transceiver devices to which the request is to be sent. Information about suitable transceiver devices is kept by the NW node and may comprise information about which transceiver devices that are within the coverage of the NW node and their capability to do such monitoring. In some embodiments, time instants for measurements are also included in the request. When the request is formed, it is provided to a transmitter interface element 606 which is able to provide the request to a transmitter of the NW node such that the request can be transmitted to the transceiver device in question.

The receiver interface 608 is also arranged to provide received signals to an interference estimator element 610 which estimates an interference level at the receive frequency. The interference estimation may be performed in a traditional way. The receiver interface 608 is further arranged to provide received signals, e.g. measurement reports from the transceiver device that has performed measurements according to the request for monitoring the determined frequency. The measurement report is provided to a measurement report decoder/parser element 612 which extracts information about signal levels on the determined frequency from the measurement report. The information may be according to any of the examples given above. The measurement report decoder/parser element 612 provides the extracted information to an intermodulation interference probability determinator element 614. The intermodulation interference probability determinator element 614 also receives an interference estimate from the interference estimator element 610. Based on the collected information, the intermodulation interference probability determinator element 614 determines whether significant intermodulation interference caused by the determined frequency is present on the receive frequency, and/or a metric indicating an estimate of how much intermodulation interference the determined frequency causes on the receive frequency. The intermodulation interference probability determinator element 614 may be aided by a correlator element 615 for making correlations between estimated interference on the receive frequency and signal levels on the determined frequency at corresponding time instants. Here, the correlator element 615 should be construed not only to be able to perform correlations but may perform other operations for performing analysis whether estimated interference on the receive frequency and signal levels on the determined frequency have any dependence (or independence, depending on used approach). The correlator element 615 may be provided remotely, e.g. in another part or node of the NW. The intermodulation interference probability determinator element 614 may be aided by a statistics collector element 617 for collecting statistics on estimated interference on the receive frequency and signal levels on the determined frequency. The statistics collector element 617 may be a memory storing the estimated interference on the receive frequency and signal levels on the determined frequency for respective time instants, and may also comprise a statistics analysis mechanism. The statistics collector element 615 may be provided remotely, e.g. in another part or node of the NW.

The operations at the NW node have been disclosed above. The corresponding operations at the transceiver device will now be disclosed below. For the sake of brevity, details that have already been disclosed with reference to the NW node operations are avoided to be repeated in the disclosure with reference to the transceiver device unless necessary for clear understanding of particular features at the transceiver device. It is assumed that the skilled reader will realise that the corresponding details disclosed with reference to the NW node operations are applicable also for the operations at the transceiver device.

Figure 7:
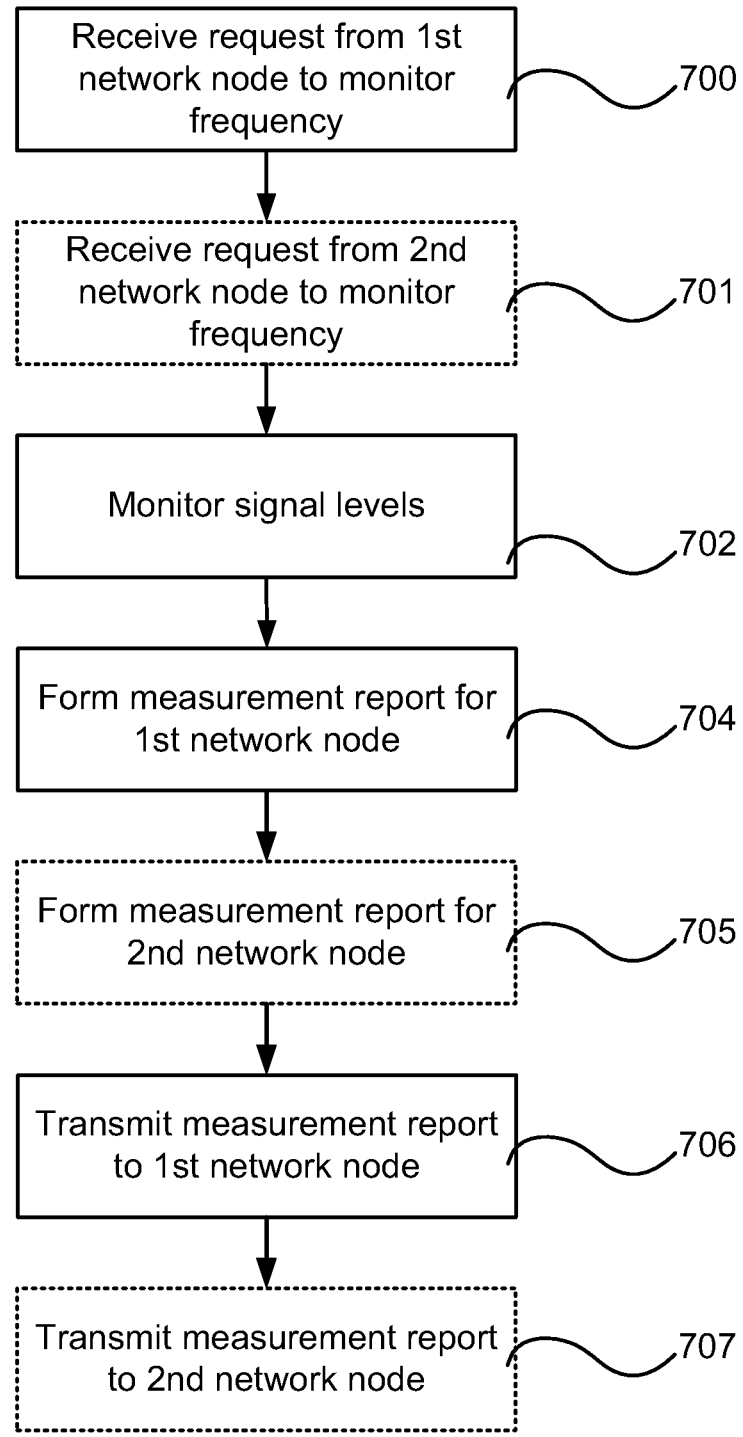
FIG. 7 is a flow chart illustrating a method of a transceiver device for collecting data related to interference caused by intermodulation according to an embodiment.

FIG. 7 is a flow chart illustrating a method of a transceiver device for collecting data related to interference caused by intermodulation according to an embodiment. The transceiver device receives 700 a request from a first NW node to monitor one or more frequencies. As above, for the sake of easier understanding, the following disclosure will be made as if only one frequency is to be monitored, but it is readily understood that monitoring of a plurality of frequencies is equally possible.

Optionally, the transceiver device may serve more than one NW node with monitoring. Thus, the transceiver device may receive 701 a request also from a second NW node to monitor a frequency.

The transceiver device monitors signals on the frequency according to the request. Where the request comprises an indication of time instants for measurements, the transceiver device follows those indications, if possible. The time instants for the measurements may also be pre-defined, as discussed above, wherein the transceiver device follows performs the measurements accordingly, if possible. The transceiver device may also perform the measurements whenever it is feasible to do such measurements. For a radio access network setup where measurement gaps are provided, these may be suitable time instants for doing the measurements. Time instants of the measurements may be recorded together with the measurements, which is particularly important when measurement time instants are not according to indications in the request or pre-defined. When the measurement time instants are according to the indications in the request or according to a pre-defined timing scheme, the timing information is inherent and need not be separately recorded. When measurements comprise a mix of the above, it may be beneficial to keep timing information for all the measurements. The timing information may for example refer to transmission time interval (TTI), slot, radio symbol, or time.

A measurement report is formed 704, and optionally a further measurement report is formed 705 for the second NW node. The measurement report may be formed according to a proprietary format arranged for the approach of determination of intermodulation interference, or may be according to a standard format, e.g. as a measurement report normally used in a handover process for e.g. inter frequency, IF, or inter radio access technology, IRAT, handover. The forming 704 of the measurement report may for example use existing mechanisms, e.g. used for RRM, or may be made on an application level in the transceiver device, wherein an application program, e.g. downloaded, may be executed by the transceiver device to form 704 the measurement report. The report includes information about the signal levels, and possibly the time instants for respective measurement as discussed above. The information about the signal levels on the frequency may for example comprise an indication on received signal strength on the frequency. The signal strength determination may for example be according to a standard received signal strength indicator, RSSI, measurement. The information about the signal levels on the frequency may for example comprise a metric for received power for a reference signal on the frequency. The received power for the reference signal may for example be a standard measurement for reference signal received power, RSRP, measurement. The information about the signal levels on the frequency may for example comprise a metric for received quality for the reference signal on the frequency. The quality may for example be determined based on RSRP and RSSI forming a reference signal received quality, RSRQ, e.g. formed based on a quota of RSRP and RSSI. The information about the signal levels on the frequency may for example comprise an aggregate metric formed from the metric for received power and the metric for received quality for the reference signal on the frequency. Also other measurements, like signal-to-interference-and-noise ratio, SINR, signal-to-noise ratio, SNR, etc., are possible. Any combination of two or more of these metrics may also be used in the measurement report. The report may be formed with a certain periodicity or be provided at a time indicated in the request.

Once the report is formed 704, it is transmitted to the first NW node. The transmission may be scheduled by the NW node. For the case that a second measurement report is formed 705 for a second NW node, that measurement report is transmitted 707 to the second NW node in a similar way.

Figure 8:
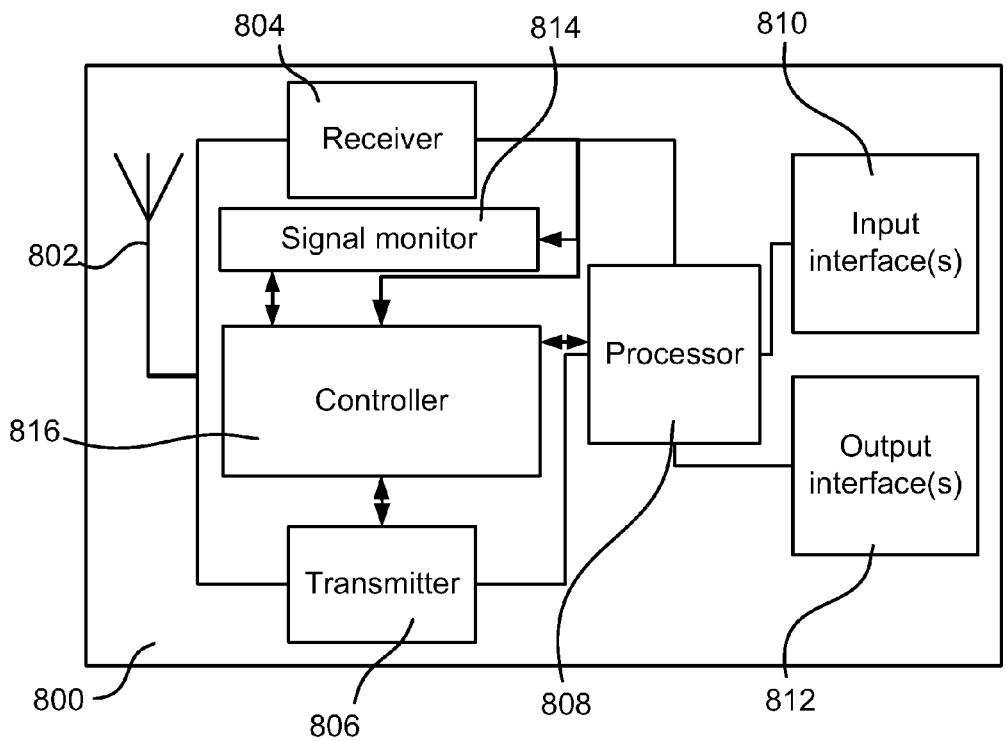
FIG. 8 is a block diagram schematically illustrating a transceiver device according to an embodiment.

FIG. 8 is a block diagram schematically illustrating a transceiver device 800 according to an embodiment. The transceiver device 800 comprises an antenna arrangement 802, a receiver 804 connected to the antenna arrangement 802, a transmitter 806 connected to the antenna arrangement 802, a processing element 808 which may comprise one or more circuits, one or more input interfaces 810 and one or more output interfaces 812. The interfaces 810, 812 can be user interfaces and/or signal interfaces, e.g. electrical or optical. The transceiver device 800 is arranged to operate in a cellular communication network, e.g. as a terminal such as a user equipment, UE, a modem, a cell phone, a computer or, any electric or electronic device capable of wireless communication with a NW node but in some embodiments also as a NW node such as a base station operating a cell, as will be explained below. In particular, by the processing element 808 being arranged to perform the embodiments demonstrated with reference to FIG. 7, the transceiver device 800 is capable of monitoring one or more determined frequencies for aiding a NW node in determining intermodulation interference issues. The processing element 808 can also fulfil a multitude of tasks, e.g. signal processing to enable reception and transmission since it is connected to the receiver 804 and transmitter 806, executing applications, controlling the interfaces 810, 812, etc.

The receiver 804 is here demonstrated as a single element, but may be construed as one or more receiver circuits receiving at one or more frequencies. The same applies for the transmitter 806.

The transceiver device 800 may comprise a signal monitor 814 arranged to measure a signal level on the determined frequency, i.e. on the frequency given by the request as demonstrated above. The signal monitor 814 is thus connected to an output of the receiver 804 to be able to gain signal levels. The output of the receiver 804 is also connected to a controller wherein the controller 816 is able to extract information about how the measurements are to be performed from the received request. The controller 816 is connected to provide signals to the signal monitor 814 to provide information for the signal monitor to perform its task. The controller 816 is arranged to receive an output from the signal monitor 814 to be able to form measurement reports, as demonstrated above. The controller 816 may also be arranged to interact with the processing element 808 of the transceiver device 800. The interference level estimator 814 and the controller 816 may thus monitor signal levels on the determined frequency and form one or more measurement reports accordingly, which may be performed according to any of the examples given above.

The controller 816 is thus arranged to form the measurement report(s) to one or more NW nodes about signal levels on the one or more determined frequencies. The signal monitor 814 is illustrated as a separate functional element, but may be implemented within the controller 816 in some embodiments. The controller 816 is illustrated as a separate functional element, but may be implemented within the processing element 808 in some embodiments. For example, the signal monitor 814 and the controller 816 may be implemented as software objects handled by the processing element 808.

The controller 816 is arranged to provide the formed measurement report to the transmitter which transmits the measurement report to the (respective) NW node, e.g. at times scheduled by the (respective) NW node.

Figure 9:
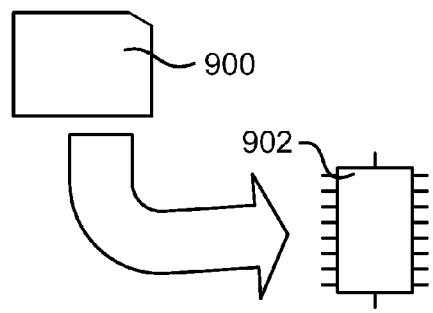
FIG. 9 schematically illustrates a computer-readable medium and a processing device of a transceiver device according to an embodiment.

The methods according to the present invention is suitable for implementation with aid of processing means, such as computers and/or processors, especially for the case where the processing element 808 and/or controller 816 demonstrated above comprises a processor handling monitoring of signal levels on a frequency, as demonstrated above. Therefore, there are provided computer programs, comprising instructions arranged to cause the processing means, processor, or computer to perform the steps of any of the methods according to any of the embodiments described with reference to FIG. 7. The computer programs preferably comprises program code which is stored on a computer readable medium 900, as illustrated in FIG. 9, which can be loaded and executed by a processing means, processor, or computer 902 to cause it to perform the methods, respectively, according to embodiments of the present invention, preferably as any of the embodiments described with reference to FIG. 7. The computer 902 and computer program product 900 can be arranged to execute the program code sequentially where actions of the any of the methods are performed stepwise. The processing means, processor, or computer 902 may be an embedded system. Thus, the depicted computer readable medium 900 and computer 902 in FIG. 9 should be construed to be for illustrative purposes only to provide understanding of the principle, and not to be construed as any direct illustration of the elements. For example, the computer program product 900 may be applied on an application level in the transceiver device, wherein the computer program product 900 may be an application program which may be downloaded and executed by the transceiver device. In such a case, the computer program product 900 could have been illustrated as a server holding the application program.

Figure 10:
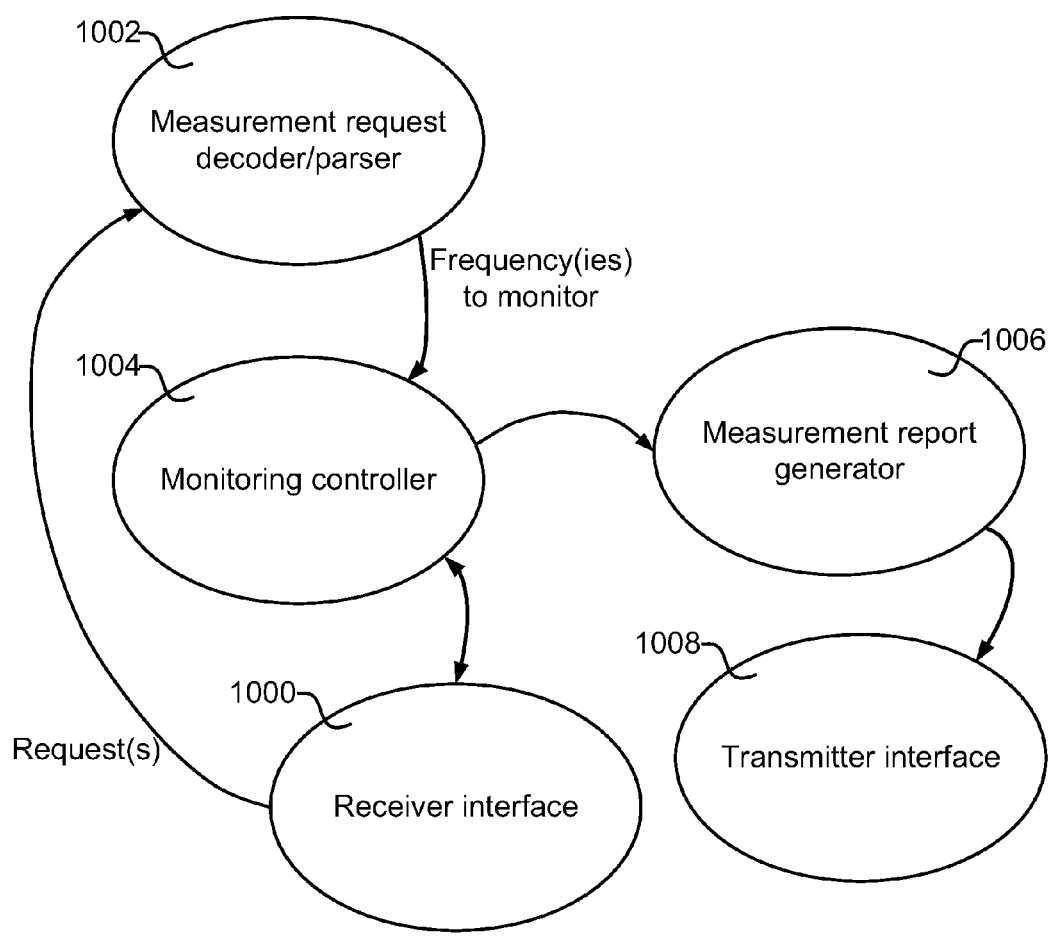
FIG. 10 schematically illustrates functional elements of collecting data for detecting interference caused by intermodulation in a network node for wireless communication according to an embodiment.

The implementation of the above demonstrated approach for collecting information about signal levels on a frequency given by a request from a NW node may comprise software and hardware elements. FIG. 10 is a schematic representation of such elements and their interactions according to an embodiment. A receiver interface element 1000 is in possession of received signals and among them there is the request for monitoring from the NW node(s). The request(s) is provided to a measurement request decoder element 1002 which is arranged to decode the request and parse it to obtain at least the frequency to be monitored. Also other information that may be contained in the request, as discussed above, may be extracted. The information about the monitoring is provided to a monitoring controller element 1004 which interacts with the receiver interface element 1000 to monitor the frequency according to the request and collect information about the signal levels on the frequency at time instants, as also discussed above. The collected information is provided to a measurement report generator element 1006 which forms one or more measurement reports, which are provided to a transmitter interface element 1008 such that the transmitter can transmit the measurement reports to the NW node as discussed above. The elements may for example to some degree be implemented using existing mechanisms, e.g. used for RRM. The elements may be implemented as a dedicated mechanism. The elements may be implemented on an application level in the transceiver device, wherein an application program, e.g. downloaded, may be executed by the transceiver device. Any combination of any of these is also a feasible implementation.

Figure 11:
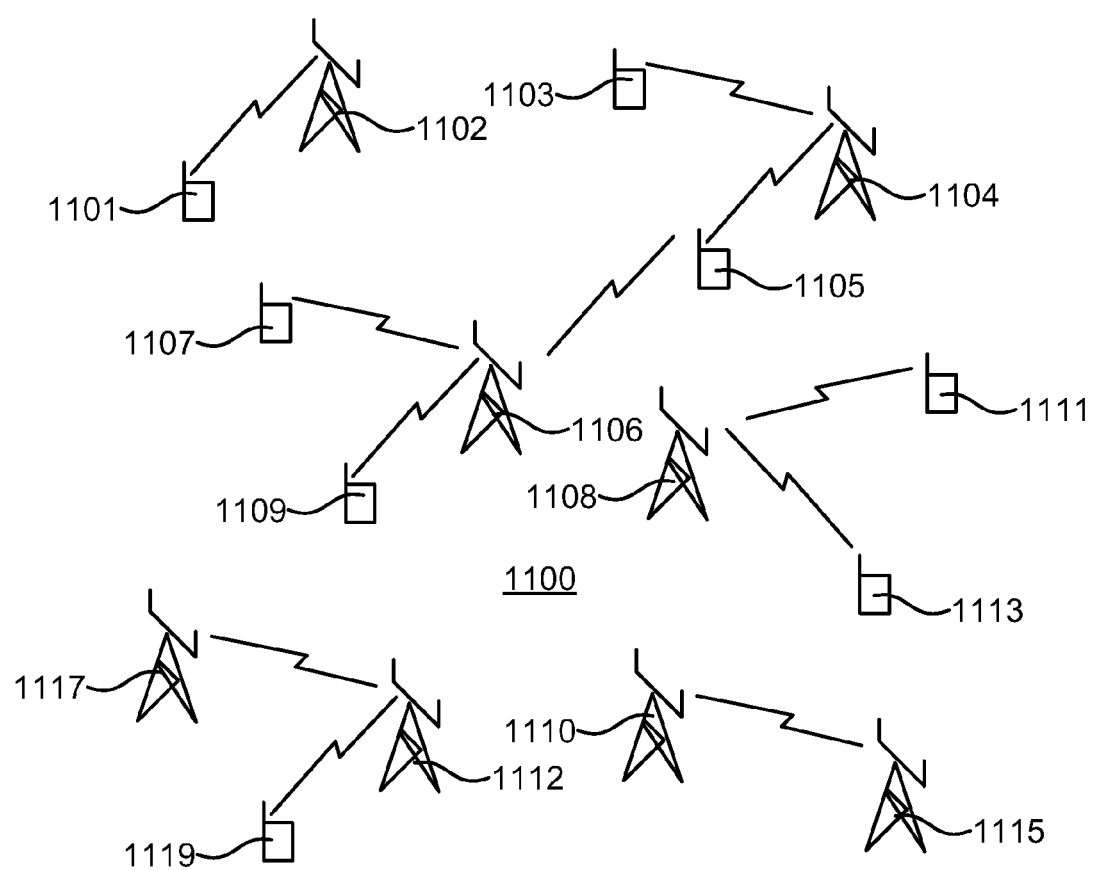
FIG. 11 schematically illustrates a system according to an embodiment.

FIG. 11 schematically illustrates a system 1100 according to an embodiment. FIG. 11 illustrates a plurality of NW nodes 1102, 1104, 1106, 1108, 1110, 1112 which are each capable of determining whether signals at respective determined frequencies significantly cause intermodulation interference at their respective receive frequency or frequencies. The illustration is chosen such that a number of feasible variants and combinations are shown. It is however to be noted that not all of these variants or combinations need be implemented in one and same system, although that also is possible.

The NW node 1102 transmits its request for monitoring one or more determined frequencies to a transceiver device 1101, which in turn performs the monitoring according to the request and provides one or more measurement reports to the NW node 1102. The NW node 1102 performs its processing of the received measurement reports and its own measurements to determine whether intermodulation issues are significant.

The NW node 1104 transmits its request for monitoring one or more determined frequencies to transceiver devices 1103, 1105, which in turn perform the monitoring according to the request and provide one or more measurement reports to the NW node 1104. The NW node 1104 performs its processing of the received measurement reports and its own measurements to determine whether intermodulation issues are significant. The NW node 1106 transmits its request for monitoring one or more determined frequencies to transceiver devices 1105, 1107, 1109, which in turn perform the monitoring according to the request and provide one or more measurement reports to the NW node 1106. The NW node 1106 performs its processing of the received measurement reports and its own measurements to determine whether intermodulation issues are significant. Here, it is to be noted that transceiver device 1105 serves both the NW node 1104 and the NW node 1106.

The NW node 1108 transmits its request for monitoring one or more determined frequencies to transceiver devices 1111, 1113, which in turn perform the monitoring according to the request and provide one or more measurement reports to the NW node 1108. The NW node 1108 performs its processing of the received measurement reports and its own measurements to determine whether intermodulation issues are significant. Here, it is to be noted that NW node 1108 uses both transceiver devices 1111, 1113 for collecting information, but each of the transceiver devices 1111, 1113 only serve the NW node 1108.

The NW node 1110 transmits its request for monitoring one or more determined frequencies to a transceiver device 1115, which in this case is another NW node, which in turn performs the monitoring according to the request and provides one or more measurement reports to the NW node 1110. The NW node 1110 performs its processing of the received measurement reports and its own measurements to determine whether intermodulation issues are significant. Here, it is to be noted that the transceiver device 1115 is another NW node, which for example may be a base station operating a cell with a more limited coverage and within the coverage of a cell operated by the NW node 1110. These different levels of cells are sometimes referred to as macro cell, micro cell, femto cell etc. The transceiver device 1115 may also be what is referred to as a cluster head which is a NW node in a device-to-device arrangement among transceiver devices.

The NW node 1112 transmits its request for monitoring one or more determined frequencies to transceiver devices 1117, 1119, which in turn perform the monitoring according to the request and provide one or more measurement reports to the NW node 1112. The NW node 1112 performs its processing of the received measurement reports and its own measurements to determine whether intermodulation issues are significant. Here, it is to be noted that NW node 1112 uses both a transceiver device 1117 which itself is a NW node and a transceiver device 1119 which is a terminal device, for collecting information.

The invention claimed is:

1. A method, in a network node of a radio access network, for determining whether a signal on a receive frequency of the network node comprises interference caused by intermodulation, the method comprising:
   determining at least one frequency of a signal which potentially gives rise to an intermodulation product on the receive frequency;
   transmitting a request to a transceiver device, wherein the request includes information about the determined at least one frequency and an instruction to monitor that at least one frequency;
   estimating an interference level of the signal on the receive frequency at one or more time instants;
   receiving a measurement report from the transceiver device, wherein the measurement report includes information about signal levels on the at least one frequency at one or more time instants; and
   determining whether the signal on the receive frequency of the network node comprises interference caused by intermodulation based on the estimated interference level at the receive frequency and the measurement report.

2. The method of claim 1, wherein the determining of the at least one frequency comprises accessing a look-up table based on the receive frequency.

3. The method of claim 1, wherein the transmitting of the request comprises transmitting a measurement report request according to a radio resource management (RRM) procedure.

4. The method of claim 1, wherein the information about the signal levels of the signal on the at least one frequency comprises at least one of:
   an indication on received signal strength on the at least one frequency;
   a metric for received power for a reference signal on the at least one frequency;
   a metric for received quality for the reference signal on the at least one frequency; and
   an aggregate metric formed from the metric for received power and the metric for received quality for the reference signal on the at least one frequency.

5. The method of claim 1, wherein the determining whether the signal on the receive frequency of the network node comprises interference caused by intermodulation includes correlating the estimated interference level at the receive frequency and the information about signal levels of the signal on the at least one frequency for corresponding time instants.

6. The method of claim 1, wherein the estimate of interference level at the receive frequency and the information about signal levels of the signal on the at least one frequency are accompanied by an indication on the respective one or more time instants.

7. The method of claim 1, wherein the request is accompanied by an indication of the one or more time instants.

8. The method of claim 1, further comprising:
   transmitting a request to a second transceiver device, wherein the request to the second transceiver device includes information about the determined at least one frequency and an instruction to monitor that signal on the at least one frequency;
   receiving a second measurement report from the second transceiver device, wherein the second measurement report includes information about signal levels of a signal on the at least one frequency at one or more time instants; and
   wherein the determining of whether the signal on the receive frequency of the network node comprises interference caused by intermodulation is further based on the second measurement report.

9. A computer program product stored in a non-transitory computer readable medium for determining whether a signal on a receive frequency of a network node of a radio access network comprises interference caused by intermodulation, the computer program product comprising software instructions which, when run on one or processors of the network node, causes the network node to:
   determine at least one frequency of a signal which potentially gives rise to an intermodulation product on the receive frequency;

transmit a request to a transceiver device, wherein the request includes information about the determined at least one frequency and an instruction to monitor that at least one frequency;

estimate an interference level of the signal on the receive frequency at one or more time instants;

receive a measurement report from the transceiver device, wherein the measurement report includes information about signal levels on the at least one frequency at one or more time instants; and determine whether the signal on the receive frequency of the network node comprises interference caused by intermodulation based on the estimated interference level at the receive frequency and the measurement report.

10. A network node of a radio access network, the network node comprising:
a transmitter;
a receiver;
a controller circuit;
wherein the controller circuit is configured to:
determine at least one frequency of a signal which potentially gives rise to an intermodulation product on a receive frequency of the network node;
cause the transmitter to transmit a request to a transceiver device, wherein the request includes information about the determined at least one frequency and an instruction to monitor that signal on the at least one frequency; and
estimate an interference level of a signal received by the receiver at the receive frequency at one or more time instants; and
wherein the receiver is configured to receive a measurement report from the transceiver device, wherein the measurement report includes information about signal levels of the signal on the at least one frequency at the one or more time instants; and
wherein the controller circuit is further configured to determine whether the signal on the receive frequency of the network node comprises interference caused by intermodulation based on the estimated interference level at the receive frequency and the measurement report.

11. The network node of claim 10, wherein the controller circuit is configured to access a look-up table based on the receive frequency to determine the at least one frequency.

12. The network node of claim 10, wherein the request comprises a measurement report request according to a radio resource management (RRM) procedure.

13. The network node of claim 10, wherein the information about signal levels of the signal on the at least one frequency comprises at least one of:
an indication on received signal strength on the at least one frequency;
a metric for received power for a reference signal on the at least one frequency;
a metric for received quality for the reference signal on the at least one frequency; and
an aggregate metric formed from the metric for received power and the metric for received quality for the reference signal on the at least one frequency.

14. The network node of claim 10, wherein the controller circuit is configured to correlate the estimated interference level at the receive frequency and the information about signal levels of the signal on the at least one frequency for corresponding time instants to determine whether the signal on the receive frequency of the network node comprises interference caused by intermodulation.

15. The network node of claim 10, wherein the controller circuit is configured to cause a remote element to correlate the estimated interference level at the receive frequency and the information about signal levels of the signal on the at least one frequency for corresponding time instants to determine whether the signal on the receive frequency of the network node comprises interference caused by intermodulation.

16. The network node of claim 10, wherein the estimate of interference level at the receive frequency and the information about signal levels of the signal on the at least one frequency are accompanied by an indication of respective time instants.

17. The network node of claim 10, wherein the request is accompanied by an indication of the one or more time instants.

18. The network node of claim 10:
wherein the controller circuit is configured to cause the transmitter to transmit a request to a second transceiver device, wherein the request to the second transceiver device includes information about the determined at least one frequency and an instruction to monitor that at least one frequency;
wherein the receiver is configured to receive a second measurement report from the second transceiver device, wherein the second measurement report includes information about signal levels of a signal on the at least one frequency at one or more time instants; and
wherein the controller circuit is configured to determine whether the signal on the receive frequency of the network node comprises interference caused by intermodulation also based on the second measurement report.

19. A method, in a transceiver device arranged to operate in a radio access network, for collecting data for determination whether a signal on a receive frequency of a network node comprises interference caused by intermodulation, the method comprising:
receiving a request from the network node, wherein the request includes information about at least one frequency of a signal which potentially gives rise to an intermodulation product on the receive frequency of the network node and an instruction to monitor that at least one frequency;
monitoring signal levels of the signal on the at least one frequency at one or more time instants; and
transmitting a measurement report to the network node, wherein the measurement report includes information about the signal levels at the one or more time instants of the signal on the at least one frequency, and wherein the information about the signal levels of the signal on the at least one frequency are accompanied by an indication of the respective time instants.

20. The method of claim 19, wherein the request comprises a measurement report request according to a radio resource management (RRM) procedure.

21. The method of claim 19, wherein the information about signal levels of the signal on the at least one frequency comprises at least one of:
an indication on received signal strength on the at least one frequency;
a metric for received power for a reference signal on the at least one frequency;

a metric for received quality for the reference signal on the at least one frequency; and an aggregate metric formed from the metric for received power and the metric for received quality for the reference signal on the at least one frequency.

22. The method of claim 19, wherein the request is accompanied by another indication of the one or more time instants.

23. The method of claim 19, further comprising:

receiving a request from a second network node, wherein the request from the second network node includes information about at least one frequency of a signal which potentially gives rise to an intermodulation product on a receive frequency of the second network node and an instruction to monitor that at least one frequency;

monitoring signal levels of the signal on the at least one frequency which potentially gives rise to an intermodulation product on the receive frequency of the second network node at one or more time instants; and transmitting a second measurement report to the second network node, wherein the second measurement report includes information about signal levels at the one or more time instants of the signal on the at least one frequency which potentially gives rise to an intermodulation product on the receive frequency of the second network node.

24. A computer program product stored in a non-transitory computer readable medium for collecting data by a transceiver device arranged to operate in a radio access network, the data for determination whether a signal on a receive frequency of a network node comprises interference caused by intermodulation, the computer program product comprising software instructions which, when run on one or more processing circuits of a transceiver device, causes the transceiver device to:

receive a request from the network node, wherein the request includes information about at least one frequency of a signal which potentially gives rise to an intermodulation product on the receive frequency of the network node and an instruction to monitor that at least one frequency;

monitor signal levels of the signal on the at least one frequency at one or more time instants; and transmit a measurement report to the network node, wherein the measurement report includes information about the signal levels at the one or more time instants of the signal on the at least one frequency, and wherein the information about the signal levels of the signal on the at least one frequency are accompanied by an indication of the respective time instants.

25. A transceiver device configured to work in a radio access network, the transceiver device comprising:

a transmitter;
a receiver;
a controller circuit;
wherein the receiver is arranged to receive a request from a network node of the radio access network, wherein the request includes information about at least one frequency of a signal which potentially gives rise to an intermodulation product on a receive frequency of the network node and an instruction to monitor that at least one frequency;

wherein the controller circuit is configured to control monitoring of signal levels of a signal received by the receiver on the at least one frequency at one or more time instants and to form a measurement report, wherein the measurement report includes information about the signal levels of the signal on the at least one frequency at the one or more time instants, and wherein the information about the signal levels of the signal on the at least one frequency are accompanied by an indication of the respective time instants; and wherein the transmitter is configured to transmit the measurement report to the network node.

26. The transceiver device of claim 25, wherein the request comprises a measurement report request according to a radio resource management (RRM) procedure.

27. The transceiver device of claim 25, wherein the information about signal levels of the signal on the at least one frequency comprises at least one of:

an indication on received signal strength on the at least one frequency;

a metric for received power for a reference signal on the at least one frequency;

a metric for received quality for the reference signal on the at least one frequency; and an aggregate metric formed from the metric for received power and the metric for received quality for the reference signal on the at least one frequency.

28. The transceiver device of claim 25, wherein the request is accompanied by another indication on the one or more time instants.

29. The transceiver device of claim 25:

wherein the receiver is configured to receive a request from a second network node, wherein the request includes information about at least one frequency of a signal which potentially gives rise to an intermodulation product on a receive frequency of the second network node and an instruction to monitor that signal on the at least one frequency;

wherein the controller circuit is configured to control monitoring of signal levels, by the receiver, of the signal on the at least one frequency that potentially gives rise to the intermodulation product on the receive frequency of the second network node at one or more time instants and to form a second measurement report, wherein the second measurement report includes information about signal levels of the signal on the at least one frequency that potentially gives rise to the intermodulation product on the receive frequency of the second network node at the one or more time instants; and wherein the transmitter is configured to transmit the second measurement report to the second network node.

* * * * *

UNITED STATES PATENT AND TRADEMARK OFFICE
CERTIFICATE OF CORRECTION

PATENT NO. : 9,693,360 B2
APPLICATION NO. : 14/435774
DATED : June 27, 2017
INVENTOR(S) : Lindoff et al.

It is certified that error appears in the above-identified patent and that said Letters Patent is hereby corrected as shown below:

In the Specification

In Column 1, Line 26, delete "duplex division" and insert -- division duplex --, therefor.

In Column 2, Line 12, delete "due third" and insert -- due to third --, therefor.

In Column 13, Line 21, delete "statistics collector element 615" and insert -- statistics collector element 617 --, therefor.

In Column 16, Line 21, delete "decoder" and insert -- decoder/parser --, therefor.

Signed and Sealed this
Tenth Day of October, 2017

Joseph Matal
*Performing the Functions and Duties of the*
*Under Secretary of Commerce for Intellectual Property and*
*Director of the United States Patent and Trademark Office*